May 15, 1934.    M. D'ANGELO    1,958,784
SIGNALING DEVICE
Filed May 5, 1933
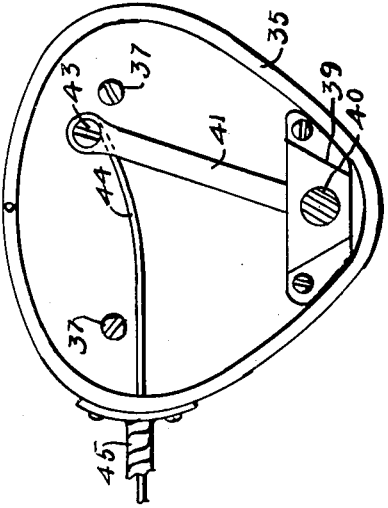
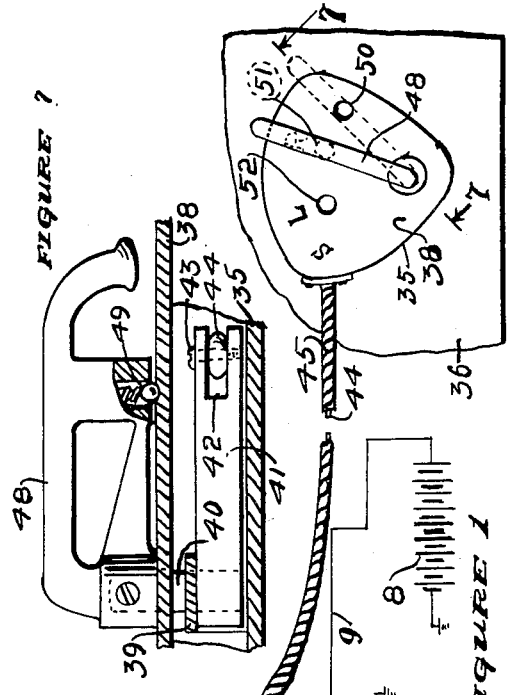
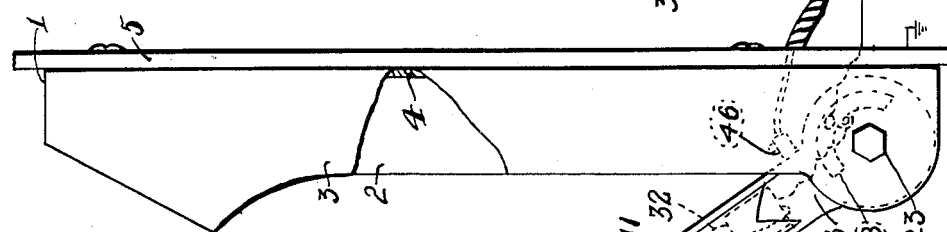
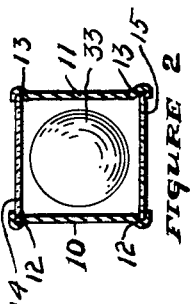
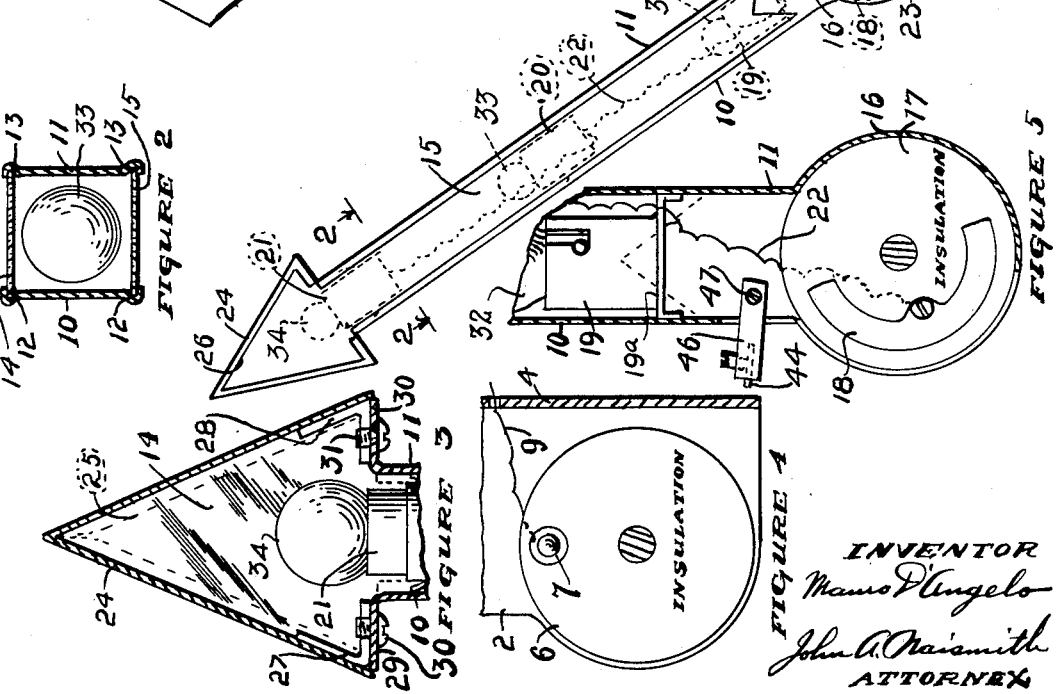
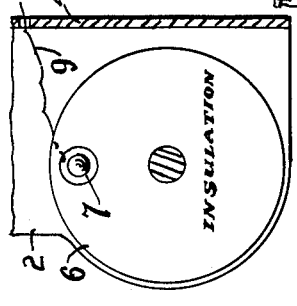
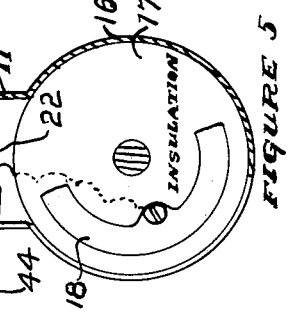
INVENTOR
Mauro D'Angelo
John A. Naismith
ATTORNEY Patented May 15, 1934

1,958,784

UNITED STATES PATENT OFFICE 1,958,784

SIGNALING DEVICE

Mauro D'Angelo, San Jose, Calif.

Application May 5, 1933, Serial No. 669,512

1 Claim. (Cl. 116—54)

The present invention relates particularly to a signal for use on automobiles whereby the driver thereof may readily indicate to others when he is about to slow down or stop, or turn to the right or left.

It is one object of the invention to provide a device of the character indicated that will be automatically illuminated when moved into an operative position, and one that will be simple in form and construction, economical to manufacture, strong and durable, in which the various working parts are quickly and easily reached for repair or replacement, which is positively moved into any desired position by a manually operated means conveniently disposed relative to the operator of the car and also having the above named characteristics, and that will as a whole be highly efficient in its practical application.

In the drawing:

Figure 1 is an elevation of a device embodying my invention mounted upon the frame of an automobile top and with the operating means mounted upon the instrument board or panel.

Figure 2 is a section on line 2—2 of Figure 1.

Figure 3 is an enlarged section through the head of the signaling element.

Figure 4 is a section through a portion of the base of the signal element casing.

Figure 5 is a section through the base of the signal element.

Figure 6 is a front elevation of the operating device with the top removed.

Figure 7 is a section on line 7—7 of Figure 1.

In the particular embodiment of the invention herein disclosed, I show at 1 an elongated casing having two sides 2 and 3 and a back 4 only, and mounted upon the outer side of the forward left post of an automobile top, a portion of the same being shown at 5.

On the inner side of the lower end of side 2 is mounted a rubber disc 6 having the contact portion of a ball-spring catch mounted therein as at 7 and connected to battery 8 by wire 9.

The body of the signal element is formed of two strips of sheet metal 10 and 11 for its edges and provided with channels 12 and 13 respectively to receive the translucent members 14 and 15 forming the front and rear thereof. The bases of these strips are connected to form one integral whole as at 16, and in the pocket so formed is mounted a rubber disc 17 in opposed relation to disc 6. In disc 17 is seated an arcuate strip of metal 18 connected to the several lamp sockets 19, 20, 21 by wire 22. A bolt 23 is passed through casing 1 and the centers of discs 6 and 17 to permit rotation of the signal element, the strip 18 being so placed that the part 7 will be out of contact therewith when the element is rotated into casing 1 but in contact therewith to close the electric circuit when the element is extended and thereby light the lamps.

The head of the signal element is formed of a single strip of sheet metal 24 with flanges 25—26 and bent into the form of an inverted V. The ends of the strip are fitted with brackets 27—28 which are removably secured to outwardly turned flanges 29—30 on strips 10—11 by screws 30—31. The translucent colored elements 14—15 are cut to conform to the shape of the body and head of the element and are first slid into the channels 12—13 and then the head is fastened in place as described.

In the several sockets are mounted lamps 32, 33, 34. Each socket, as 19, is mounted on a bracket, as 19a, which is in turn mounted on walls 10 and 11, spacing and supporting the said walls and serving as a ground, placing the lamps in the electric circuit including the battery and the switch 7—18.

For operating the signal I provide at 35 a cast receptacle which is mounted on panel 36 by screws 37 and is provided with a cover 38. In the receptacle is mounted a bracket 39 in which is rotatably mounted a stub shaft 40, and secured to the shaft is an arm 41 having a slot 42 formed in the free end thereof. A screw 43 is seated in this slotted end, and a wire 44 is bent around the screw and passed out through the wall of the receptacle, its other end passing through a flexible conduit 45 and attached to a link 46 pivotally mounted on the signal arm as at 47.

An operating arm 48 is mounted on shaft 40 to bear against top 38 to hold the same in place, and this arm is fitted with a ball-spring catch 49 adapted to seat in sockets as 50, 51 and 52 in the top 38.

When the operating arm 48 is in the position shown in dotted lines the signal element is seated within the casing 1 and the lamps are not lighted, but when the arm is moved to the position shown in solid lines the signal is moved to the "turn right" position as shown and the lamps are lighted. A further movement of the operating arm will move the signal to the "turn left" or "stop" position as desired.

It is to be understood, of course, that while I have shown and described but one specific embodiment of my invention, changes in form, construction, and method of assembly and operation may be made within the scope of the appended claim.

I claim:

In a device of the character described, a signal arm comprising two strips of sheet metal joined at one end to form an integral whole, lamp brackets mounted therein to space and support the same, outwardly turned flanges on the other ends of the strips, a head, means for detachably connecting said head to said flanges, and translucent windows mounted in opposite sides of the arm, and lighting means for the lamps.

MAURO D'ANGELO.